UNITED STATES PATENT OFFICE.

PEDER FARUP, OF TRONDHJEM, NORWAY.

PROCESS OF PRODUCING YELLOW PIGMENTS FROM TITANIFEROUS IRON ORES.

1,087,575.

Specification of Letters Patent. Patented Feb. 17, 1914.

No Drawing. Application filed April 20, 1912. Serial No. 692,143.

*To all whom it may concern:*

Be it known that I, PEDER FARUP, a subject of the King of Norway, residing at Trondhjem, Norway, have invented certain new and useful Improvements in Processes of Producing Yellow Pigments from Titaniferous Iron Ores; and I do hereby declare the following to be a full, clear, and exact description of the invention, such as will enable others skilled in the art to which it appertains to make and use the same.

This invention relates to a process of treating titaniferous iron ores so as to obtain a pigment powder of a light yellow shade about the same as that of light French ocher and having in most other respects the properties of red oxid of iron, in that it gives a very durable rust-preventing paint and a most durable coating.

The process is characterized by treating finely pulverized titaniferous iron ore with relatively great amounts of sulfuric acid and subsequently heating the mass. Shortly after the mixing of ore and acid a powerful reaction accompanied by an intense development of heat will take place and the mixture hardens to a solid mass which can be divided only by the blows of a hammer or the like. If the reaction does not take place by itself it can be initiated by heat and will then transmit itself through the whole mixture. The mass obtained in this manner is thereupon heated to drive out the sulfuric acid and its decomposition products, the sulfates formed being thus decomposed. The heating can be carried into effect with or without the supply of air and various gases, sulfurous acid, steam and the like in order to obtain variations in the color, said gases being then supplied during the whole treatment or preferably only during the latter part of the same. The shade of color obtained is also greatly dependent upon the temperatures employed.

It is known to produce pigments resembling red oxid of iron by roasting titaniferous iron ores and it has also been proposed to add small amounts of sulfuric acid to the ore in order to shorten the time required for the roasting process. Moreover red iron oxid pigments have been produced by adding greater amounts of sulfuric acid to iron ore preferably purple ore and afterward calcining the mass.

In the present process, however, the raw material employed is titaniferous iron ores and, what is the most important feature of this invention, a light yellow pigment is obtained. This light yellow color of the product together with its properties as a rust-preventing paint is of very great importance because the rust-preventing paints hitherto employed such as red iron oxid micaceous iron ore and the like are all of a darker color.

The following is given as a specific example by which the process may be carried out: One part by weight of titaniferous iron ore such as ilmenite in a finely pulverized state is mixed with one part by weight of sulfuric acid of 60° Bé. The mixture so produced hardens of itself to a porous rigid mass having a grayish color. This mass is heated to about 900° and in such a manner that the flame of the fire employed does not come in direct contact with the mass. The mass is thus decomposed and the sulfuric acid distilled off. The resulting yellow porous mass is then pulverized and treated in an air blast separator.

I claim—

1. The process of producing yellow pigments from titaniferous iron ores which consists in mixing the ore in a finely divided state with relatively large amount of sulfuric acid and subsequently heating the mass in the presence of a gas.

2. The process of producing yellow pigments from titaniferous iron ores which consists in mixing the ore in a finely divided state with relatively large amount of sulfuric acid and subsequently heating the mass in the presence of air.

3. The process of producing yellow pigments, which consists in mixing pulverized titaniferous ore with relatively large amount of sulfuric acid to form sulfates, and decomposing the sulfates thus formed.

In testimony that I claim the foregoing as my invention, I have signed my name in presence of two subscribing witnesses.

PEDER FARUP.

Witnesses:
 M. C. GUTTODUPLEN,
 NANA SCHIAUDER.